United States Patent [19]

O'Brien et al.

[11] Patent Number: 5,194,527
[45] Date of Patent: Mar. 16, 1993

[54] PREPARATION OF KETONE CONTAINING PHOTODEGRADABLE POLYMERS

[75] Inventors: James J. O'Brien; Kevin D. Sikkema; Duane B. Priddy, all of Midland, Mich.

[73] Assignee: The Dow Chemical Company, Midland, Mich.

[21] Appl. No.: 429,575

[22] Filed: Oct. 31, 1989

[51] Int. Cl.$^5$ .......................... C08F 2/00; C08F 216/36
[52] U.S. Cl. ........................................ 526/75; 526/316
[58] Field of Search .................................. 526/75, 316

[56] References Cited

U.S. PATENT DOCUMENTS

| | | | |
|---|---|---|---|
| 1,937,063 | 11/1933 | Meisenburg et al. | 260/2 |
| 3,753,952 | 8/1973 | Guillet et al. | 526/316 |
| 3,860,538 | 1/1975 | Guillet et al. | 260/25 HA |

Primary Examiner—Paul R. Michl
Assistant Examiner—LaVonda R. DeWitt

[57] ABSTRACT

A process for preparing polymers comprising pendant ketone functional moieties, the steps of the process comprising exposing a mixture comprising an ethylenically unsaturated addition polymerizable monomer and a β-substituted ketone compound corresponding to the formula:

$$XCH_2-CHR'-C(O)R$$

where
 X is a suitable leaving group,
 R' is hydrogen or R; and
 R is alkyl or aryl of up to 12 carbons
to vinyl ketone monomer formation conditions to prepare the corresponding vinyl ketone monomer from the β-substituted ketone compound and subsequently exposing the mixture to addition polymerization conditions to prepare the resulting polymer.

17 Claims, No Drawings

PREPARATION OF KETONE CONTAINING PHOTODEGRADABLE POLYMERS

BACKGROUND OF THE INVENTION

The present invention relates to a novel process for preparing polymers comprising pendant ketone functional moieties. More particularly the present invention relates to a novel process for preparing such polymers without handling monomers which are highly reactive. The resulting polymers are useful as photodegradable thermoplastics and in blends in which the resulting blend is also photodegradable.

Addition polymers of vinyl monomers particularly vinyl aromatic monomers and vinyl ketone polymers are previously known in the art. In particular such copolymers are disclosed in U.S. Pat. Nos. 1,937,063 and 3,753,952. Further blends of such polymers and other polymers are disclosed in U.S. Pat. No. 3,860,538. Current methods for the preparation of vinyl ketone containing polymers such as are disclosed in the foregoing U.S. patents involve the polymerization of the respective monomers. Disadvantageously vinyl ketone monomers are highly reactive and difficult to stabilize for storage. Special polymerization inhibitor systems have been developed so that these monomers can be stored or shipped safely. Such polymerization inhibitor systems, however, result in increased cost and complexity in the polymerization process. Moreover the vinyl ketone monomers are also highly toxic and can be utilized only under conditions which would insure that no environmental exposure of the monomer occur.

In addition because of the rapid rate at which vinyl ketone monomers polymerize, copolymers having good uniformity of ketone content and physical properties are difficult to prepare, even when employing continuous polymerization techniques. The vinyl ketone monomer is very quickly consumed in the polymerization, so that during the latter stages of the polymerization, polymer containing reduced ketone functionality is prepared. Blending techniques may be employed to achieve a homogeneous mixture of product properties, however, this adds additional cost to the process and is believed to result in less efficient utilization of ketone components with regard to the ultimate objective of polymer photodegradability.

In order to provide improved techniques for the preparation of polymers containing pendant ketone functionality, it is desirable to provide an improved process which avoids difficulties occurring in prior art processes.

It is also desirable to provide a process which will prepare ketone containing polymers having greater uniformity.

SUMMARY OF THE INVENTION

According to the present invention there is provided a process for preparing polymers comprising pendant ketone functional moieties, the steps of the process comprising exposing a mixture comprising an ethylenically unsaturated addition polymerizable monomer and a β-substituted ketone compound corresponding to the formula:

   (I)

wherein

X is a suitable leaving group,
R' is hydrogen or R: and
R is alkyl or aryl of up to 12 carbons
to vinyl ketone monomer formation conditions to prepare the corresponding vinyl ketone monomer from the β-substituted ketone compound and exposing the resultant mixture to addition polymerization conditions to prepare the polymer.

In a further embodiment of the present invention there is provided a process for preparing polymers comprising pendant ketone functional moieties, the steps of the process comprising a) exposing a β-substituted ketone compound corresponding to the formula:

wherein
X is a suitable leaving group,
R' is hydrogen or R; and
R is alkyl or aryl of up to 12 carbons
to vinyl ketone monomer formation conditions in a polymerization reactor or in processing equipment in operative communication with a polymerization reactor to prepare a vinyl ketone monomer;

b) forming a mixture of the vinyl ketone monomer with an addition polymerizable monomer in the polymerization reactor; and c) exposing the mixture to polymerization conditions to prepare the resulting polymer.

Because the highly reactive vinyl ketone monomer is not prepared until substantially simultaneous with its utilization in the polymerization process, the previously encountered problems and difficulties associated with prior processes for preparing such ketone functional polymers are substantially avoided.

DETAILED DESCRIPTION

The reactants utilized to prepare the vinyl ketone monomers according to the present invention contain any suitable leaving group X. Examples of suitable leaving groups include hydroxyl, carboxylate, carbonate, phosphate, phosphonate, phosphinate, phosphonium, urethane, urea, amide, imide, amine, ammonium, sulfonate, and halogen. Preferably, however, the leaving group is readily removed from the β-substituted ketone compound and does not result in the formation of remnant groups which disadvantageously effect the succeeding addition polymerization reaction or equipment used therein. For example, carboxylate groups and hydroxyl groups which result in the formation of mild carboxylic acids and water during the generation of the respective vinyl ketone monomers are preferred in as much as such remnants do not adversely effect either the addition polymerization or the reactor and associated equipment employed in the polymerization. On the other hand halogen groups will result in the formation of strong acids such as hydrochloric acid thereby necessitating the use of more expensive stainless steel or glass lined reactors to provide corrosion resistance. Preferred leaving groups are hydroxyl or $C_{1-12}$ acyloxy, carbonate or dialkyl amino groups.

Examples of suitable β-substituted ketones are those wherein the leaving group is acetoxy, acryloxy, methacryloxy, maleoxy, fumaryloxy and acetylacetoxy, methyl carbonate, ethyl carbonate, dimethylamino, diethylamino, di-t-butylamino, ethoxycarbonylamino, etc. Most preferred leaving groups are hydroxy or acetoxy.

Besides unsymmetrical β-substituted ketones, symmetrical compounds such as bis β-keto carbonates may also be employed. Such compounds correspond to the foregoing formula I where X is

—OC(O)O—CH$_2$—CHR'—C(O)R and R' and R are as previously defined. Such compounds readily cleave under known conditions to yield the corresponding vinyl ketone, hydroxy ketone, and carbon dioxide.

The remainder of the β-substituted ketone compound is ideally selected in view of cost and availability. That is, R' is preferably hydrogen or methyl and R is C$_{1-4}$ lower alkyl, preferably methyl or ethyl. Most preferred β-substituted ketone compounds are 1-hydroxy-2-methylpentane-3-one and 1-hydroxy-3-butanone.

The β-substituted ketone compound may be converted to the vinyl ketone monomer substantially contemporaneously with the polymerization i.e., during an in situ vinyl ketone monomer formation and polymerization process. Alternatively, the vinyl ketone monomer may be prepared in a preliminary step, either with or without the presence of the ethylenically unsaturated copolymerizable monomer, and in a subsequent step the two monomers may be polymerized. In the latter process it is possible to simultaneously remove some or substantially all of the by-product formed from the leaving group of the initially utilized β-substituted ketone compound. The reaction is preferably conducted in a substantially continuous manner or at least the β-substituted ketone is converted to the vinyl ketone monomer in a substantially continuous manner.

Several techniques exist for conversion of the β-substituted ketone to the vinyl ketone monomer. A catalyst may be employed to assist in the vinyl ketone formation or the β-substituted ketone may be reacted with a composition which results in formation of a more active leaving group. The latter procedure is exemplified by the reaction of a β-hydroxy ketone with an acylating agent or similar reactant such as an isocyanate, ketene or diketene compositions having up to 20 carbons.

A further highly desirable embodiment of the present invention utilizes a suitable catalyst to cause the leaving group of the substituted ketone compound to be removed. Suitable catalysts should not be detrimental to the subsequent addition polymerization. Examples of suitable catalysts include metallic salts, bases, acids and acid anhydrides. In the embodiment involving the β-hydroxy substituted ketone compound, preferred catalysts are acids and anhydride derivatives of acids. Suitable acid catalysts include acids selected from the group consisting of acidic ion exchange resins, organic acids and inorganic acids. Most preferred acid catalysts are selected from the group consisting of, maleic, oxalic, toluene sulfonic, itaconic, acrylic, methacrylic, phosphoric, acetic, and phenylphosphonic acids. Examples of suitable anhydride catalysts include the organic anhydrides; such as maleic, succinic, phthalic, itaconic, fumaric, citraconic, acetic, methacrylic, etc. It will be immediately appreciated by the skilled artisan that utilization of an organic acid, or where applicable its corresponding anhydride, which is also copolymerizable with the addition polymerizable monomer will result in incorporation of the catalyst into the resulting polymer under appropriate addition polymerization conditions. In this manner no residues of the acid catalyst remain in the polymer after completion of the polymerization. Examples of such "reactive" catalysts include acrylic, methacrylic, maleic, itaconic, fumaric and citraconic acids as well as their corresponding anhydrides.

The skilled artisan will further appreciate that acidic ion exchange resins may also be advantageously employed to catalyze the vinyl ketone formation, particularly to catalyze the removal of the hydroxy group of a β-hydroxy substituted ketone. Since such a dehydration process simultaneously forms free water, it is highly desirable that the acidic ion exchange resin also simultaneously absorb the water, thereby preventing it from interfering with the subsequent polymerization process or the resulting copolymers.

The polymer resulting from the process of the present invention are more particularly described by the formula:

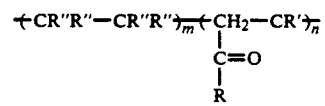

wherein R and R' are as previously defined: R" independently each occurrence is hydrogen, or a noninterfering organic or inorganic moiety, and m and n are numbers greater than zero corresponding to the relative molar proportions of the respective monomeric constituents. A free radical polymerization catalyst may be utilized in the polymerization if desired.

In a highly preferred embodiment the ethylenically unsaturated addition polymerizable monomer is a vinyl aromatic compound, acrylic or methacrylic acid, a C$_{1-4}$ alkyl acrylate or methacrylate, acrylonitrile or a mixture thereof. A most highly preferred addition polymerizable monomer is styrene.

The polymers resulting from the present invented process may be employed to prepare molded and extruded objects or articles, films, foams and other useful objects according to known techniques. In addition the resins may be blended with other thermoplastic resins such as polycarbonates, polyphenylene oxides, polyphenylene sulfides, polyesters, polyvinylchloride, polystyrene, ABS, and other known resins to create resin blends which are also photodegradable.

Having described the invention the following examples are provided as further illustrative and are not to be construed as limiting. Unless stated to the contrary parts and percentages are expressed on a weight basis.

EXAMPLES 1-10

A series of polymers were prepared by polymerizing styrene monomer with the vinyl ketone derivative of 1-hydroxy-2-methylpentane-3-one formed by contacting the 1-hydroxy-2-methylpentane-3-one with homogeneous acid catalysts. The polymerizations were conducted in standard glass ampoule reactors. The reactants were mixed, placed into the ampoules, sealed and heated to a temperature of about 150° C. for 75 minutes. The reaction and polymerization are depicted schematically according to the following equation:

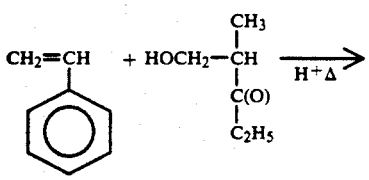

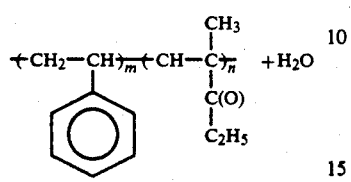

After polymerization was substantially complete the polymer was recovered, dissolved in methylene chloride solvent, and cast into a film for testing of photodegradability. Films of uniform thickness were exposed to light in an exposure cabinet equipped with UV 340 bulbs. Samples of the films were tested after 24 hours by gel permeation chromotography to determine decrease in molecular weight. The resulting decrease in molecular weight was indicative of the incorporation of pendant ketone functionality into the polymer and the resulting photodegradability of the polymer. Results are contained in Table I.

TABLE I

| Example | Comp A | Comp B | 1 | 2 | 3 | 4 | 5 | 6 | 8 | 9 | 10 |
|---|---|---|---|---|---|---|---|---|---|---|---|
| Ketone[1] % | — | — | 1 | 5 | 10 | 1 | 5 | 10 | 1 | 5 | 10 |
| Acid % | — | GA[2](17) | GA[2](17) | GA[2](17) | GA[2](17) | PA[3](1) | PA[3](1) | PA[3](1) | PA[4](0.5) | PA[4](0.5) | PA[4](0.5) |
| Beginning Mw × 10³ | 253 | 312 | 295 | 249 | 225 | 225 | 203 | 162 | 591 | 411 | 300 |
| End Mw × 10³ | 255 | 320 | 209 | 100 | 67 | 44 | 13 | 10 | 119 | 37 | 29 |

[1] 1-hydroxy-2-methylpentane-3-one
[2] glacial acetic acid
[3] phosphoric acid
[4] phenylphosphonic acid

EXAMPLE 11

A mixture of styrene and 1-hydroxy-2-methylpentane-3-one (1 mole percent) was eluted through a column of styrene/divinylbenzene acid ion exchange resin (DOWEX TM available from The Dow Chemical Company). The eluted monomer mixture was then placed into an ampoule reactor and heated to 150° C. to effect thermal polymerization. The resulting polymer was dissolved in methylene chloride, cast into a film and sampled for light degradation according to the technique of Example 1. Results are contained in Table II.

TABLE II

| Example | 11 |
|---|---|
| Ketone % | 1.1 |
| Beginning Mw | 222,000 |
| End Mw | 158,000 |

EXAMPLE 12

A mixture of styrene, 1-hydroxy-2-methylpentane-3-one (5 percent) and acrylic acid (1 percent) was heated in a glass ampoule at 150° C. The resulting terpolymer was dissolved in methylene chloride, and cast into a film for testing of light degradation according to the technique of Example 1. Results are contained in Table III.

TABLE III

| Example | 12 |
|---|---|
| Ketone % | 5 |
| Acrylic acid % | 1 |
| Beginning Mw | 255,000 |
| End Mw | 178,000 |

EXAMPLE 13

Mixtures of styrene (9.5 parts), and acetic anhydride (0.58 parts), with and without 4-hydroxy-2-butanone (0.5 parts), were polymerized in a glass ampoule at 150° C. for 60 min. The resulting polymers were cast into films for testing of light degradation according to the technique of Example 1. Results are shown in the following table.

TABLE IV

| Loss of Mw During Exposure of Polymer Films | | |
|---|---|---|
| 4-Hydroxy-2-Butanone | Polystyrene Control | Days |
| 243000 | 249600 | 0 |
| 63990 | 244500 | 1 |
| 50420 | 229100 | 2 |
| 39210 | 210800 | 3 |

What is claimed is:

1. A process for preparing polymers comprising pendant ketone functional moieties, the steps of the process comprising exposing a mixture comprising an ethylenically unsaturated addition polymerizable monomer and a β-substituted ketone compound corresponding to the formula:

$$XCH_2-CHR'-C(O)R$$

wherein
X is a suitable leaving group,
R' is hydrogen or R; and
R is alkyl or aryl of up to 12 carbons
to vinyl ketone monomer formation conditions to prepare the corresponding vinyl ketone monomer from the β-substituted ketone compound and exposing the resultant mixture to addition polymerization conditions to prepare the polymer.

2. A process according to claim 1 wherein the β-substituted ketone is substituted with a hydroxyl group or an acyloxy, carbonate or dialkyl amino group of up to 12 carbons.

3. A process according to claim 1 wherein the addition polymerizable monomer is a vinyl aromatic monomer.

4. A process according to claim 3 wherein the vinyl aromatic monomer is styrene.

5. A process according to claim 1 wherein the mixture is polymerized by exposure to thermal polymerization conditions.

6. A process according to claim 1 wherein a free radical generating addition polymerization catalyst is also present in the mixture.

7. A process according to claim 1 wherein the vinyl ketone monomer formation occurs upon contacting the mixture with a suitable catalyst which is not detrimental to the addition polymerization.

8. A process according to claim 7 wherein the catalyst is a base, an acid or an anhydride derivative of an acid.

9. A process according to claim 8 wherein the β-substituted ketone is a β-hydroxy substituted ketone.

10. A process according to claim 8 wherein the acid catalyst is selected from the group consisting of acidic ion exchange resins and organic or inorganic acids.

11. A process according to claim 10 wherein the acid catalyst is selected from the group consisting of maleic, oxalic, itaconic, acrylic, methacrylic, phosphoric, acetic, toluene sulfonic and phenylphosphonic acids.

12. A process according to claim 11 wherein the anhydride derivative of an acid is acetic anhydride, maleic anhydride or methacrylic anhydride.

13. A process according to claim 2 wherein the acyloxy group is a acetoxy, acryloxy, methacryloxy, maleoxy, fumaryloxy, or acetylacetoxy.

14. A process for preparing polymers comprising pendant ketone functional moieties, the steps of the process comprising
  a) exposing a β-substituted ketone compound corresponding to the formula:

$XCH_2-CHR'-C(O)R$ wherein
   X is a suitable leaving group,
   R' is hydrogen or R; and
   R is alkyl or aryl of up to 12 carbons
   to vinyl ketone monomer formation conditions in a polymerization reactor or in processing equipment in operative communication with a polymerization reactor to prepare a vinyl ketone monomer;
  b) forming a mixture of the vinyl ketone monomer with an addition polymerizable monomer in the polymerization reactor; and
  c) exposing the mixture to polymerization conditions to prepare the resulting polymer.

15. A process according to claim 14 wherein the β-substituted ketone is substituted with a hydroxyl group or an acyloxy, carbonate or dialkyl amino group of up to 12 carbons.

16. A process according to claim 14 wherein the addition polymerizable monomer is a vinyl aromatic monomer.

17. A process according to claim 14 wherein the β-substituted ketone is a β-hydroxy substituted ketone.

* * * * *